United States Patent
Staley et al.

(10) Patent No.: US 7,665,352 B2
(45) Date of Patent: Feb. 23, 2010

(54) ADAPTIVE OIL PRESSURE FAULT DETECTION

(75) Inventors: David R. Staley, Flushing, MI (US);
Mike M. McDonald, Macomb, MI (US);
William C. Albertson, Clinton Township, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 66 days.

(21) Appl. No.: 11/703,052

(22) Filed: Feb. 6, 2007

(65) Prior Publication Data

US 2008/0184776 A1 Aug. 7, 2008

(51) Int. Cl.
*G01M 15/09* (2006.01)

(52) U.S. Cl. .................................................. 73/114.57

(58) Field of Classification Search ............. 73/114.55, 73/114.56, 114.57
See application file for complete search history.

(56) References Cited

U.S. PATENT DOCUMENTS

| | | | | |
|---|---|---|---|---|
| 3,893,108 | A * | 7/1975 | McBride et al. | 340/507 |
| 4,328,480 | A * | 5/1982 | Keitel et al. | 340/451 |
| 4,489,311 | A * | 12/1984 | Lang et al. | 340/501 |
| 4,504,819 | A * | 3/1985 | Hosoya | 340/450.3 |
| 5,646,341 | A * | 7/1997 | Schricker et al. | 73/114.57 |
| 6,778,076 | B2 * | 8/2004 | Shidara et al. | 340/451 |
| 2003/0196479 | A1 * | 10/2003 | Kasen et al. | 73/53.05 |

* cited by examiner

*Primary Examiner*—Eric S McCall

(57) ABSTRACT

A method of monitoring pressure of oil that is implemented within an internal combustion engine includes determining an expected oil pressure value based on engine operating conditions and monitoring an actual oil pressure value based on a signal generated by an oil pressure sensor. A difference between the expected oil pressure value and the actual oil pressure value is calculated and is compared to a threshold difference. A diagnostic trouble code is generated when the difference exceeds the threshold difference.

16 Claims, 4 Drawing Sheets

ADAPTIVE OIL PRESSURE FAULT DETECTION

FIELD

The present disclosure relates to internal combustion engines, and more particularly to a method and system for adaptively detecting an oil pressure fault within an internal combustion engine.

BACKGROUND

The statements in this section merely provide background information related to the present disclosure and may not constitute prior art.

Internal combustion engines induce combustion of an air and fuel mixture to generate drive torque. More specifically, air is drawn into the engine through a throttle and is distributed to cylinders. The air is mixed with fuel and the air and fuel mixture is combusted within the cylinders to reciprocally drive pistons, which rotatably drive a crankshaft. Besides the reciprocally driven pistons, there are multiple moving components within the engine that enable and regulate the combustion process including, but not limited to, the intake and exhaust valvetrains.

In order to ensure proper operation and reduced wear of the internal components, lubricating oil is circulated through the engine. More specifically, an oil pump pumps oil from an oil pan through the engine. After the oil has been circulated through the engine, it collects within the oil pan. An oil filter is also provided in order to filter the oil before it circulates through the engine.

Oil pressure is typically monitored to ensure that it is within an appropriate operating range. More specifically, an oil pressure sensor is typically provided and is responsive to the oil pressure. An excessively high or low oil pressure can be detrimental to the engine components and can result from degraded oil, a change in oil viscosity, use of an inappropriate oil filter, a low oil level, mechanical hardware malfunction, among other reasons.

SUMMARY

The present disclosure provides a method of monitoring an oil pressure of oil that is implemented within an internal combustion engine. The method includes determining an expected oil pressure value based on engine operating conditions and monitoring an actual oil pressure value based on a signal generated by an oil pressure sensor. A difference between the expected oil pressure value and the actual oil pressure value is calculated and is compared to a threshold difference. A diagnostic trouble code is generated when the difference exceeds the threshold difference.

In other features, the method further includes trimming the expected oil pressure value based on at least one of the differences and a parameter of the engine. The method parameter includes at least one of a mileage, engine load, a cumulative number of combustion events, a cumulative number of engine starts, time and monitored temperature cycles.

In other features, the expected oil pressure value is determined from a look-up table. Expected oil pressure values that are stored within the look-up table are selectively trimmed.

In another feature, the method further includes determining whether an oil change has occurred and trimming the expected oil pressure value based on the difference if the oil change has not occurred.

In another feature, the method further includes determining whether a mileage, over which the engine has operated, exceeds a threshold mileage and trimming the expected oil pressure value based on the difference if the mileage is less than a pre-determined value.

In still another feature, the method further includes determining whether an engine speed is steady. The expected oil pressure value is determined only when the speed is steady.

In yet another feature, the engine operating conditions include an engine speed and an engine temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
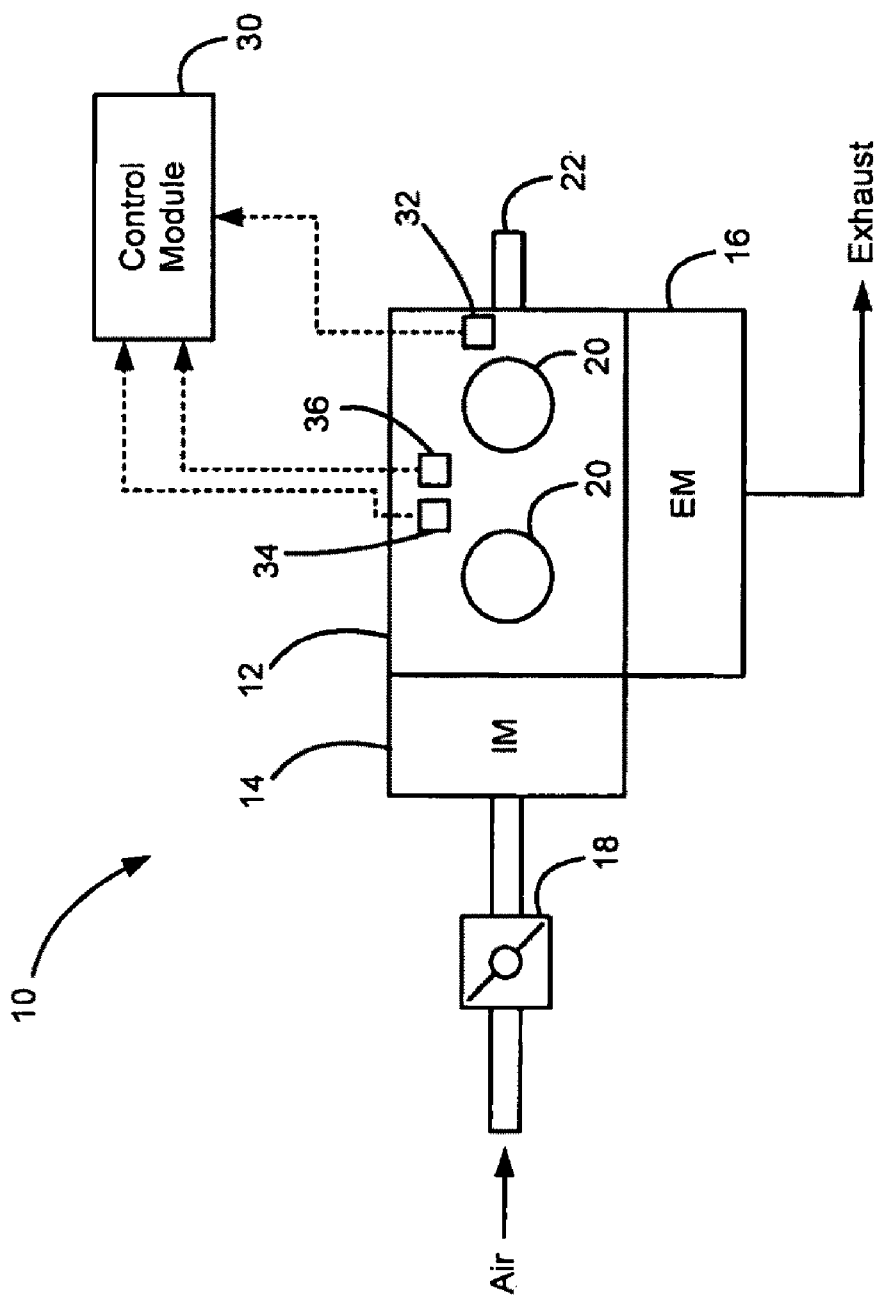
FIG. 1 is a functional block diagram of an exemplary internal combustion engine.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 is illustrated. The exemplary engine system 10 includes an engine 12, an intake manifold 14 and an exhaust manifold 16. Air is drawn into the intake manifold 14 through a throttle 18 and is distributed to cylinders 20. The air is mixed with fuel and the air and fuel mixture is combusted within the cylinders 20 to reciprocally drive pistons (not shown), which rotatably drive a crankshaft 22. Although two cylinders are shown, it is anticipated that the engine system 10 can include more or fewer cylinders 20.

A control module 30 monitors various engine operating parameters. For example, an engine speed sensor 32 monitors an engine speed ($RPM_{ENG}$) and generates a corresponding signal that is received by the control module 30. An oil pressure sensor 34 and an engine temperature sensor 36 monitor an actual oil pressure ($P_{OILACT}$) and an engine temperature ($T_{ENG}$), respectively, and generate corresponding signals that are received by the control module 30. $T_{ENG}$ can be determined based on a temperature of a cooling fluid that is circulated through the engine and/or a temperature of the oil that is circulated through the engine. Alternatively, $T_{ENG}$ can be predicted using an engine temperature algorithm (e.g., a virtual engine temperature sensor), thereby eliminating the need for the engine temperature sensor 36.

It is anticipated that the adaptive oil pressure fault detection control of the present disclosure can be implemented in any engine type including, but not limited to, the exemplary engine system described herein. For example, the adaptive oil pressure fault detection can be implemented in an active fuel management (AFM) engine, in which one or more cylinders are selectively deactivated.

In such an engine system, operation using all of the engine cylinders is referred to as an activated mode, and a deactivated mode refers to operation using less than all of the cylinders of the engine (one or more cylinders not active). In the deactivated mode, there are fewer cylinders operating. As a result, there is less drive torque available to drive the vehicle driveline and accessories (e.g., alternator, coolant pump, A/C compressor). Engine efficiency, however, is increased as a result of decreased fuel consumption (i.e., no fuel supplied to the deactivated cylinders) and decreased engine pumping. Because the deactivated cylinders do not take in air, overall engine pumping losses are reduced.

The adaptive oil pressure fault detection control of the present disclosure detects an oil pressure fault based on a comparison of the sensed oil pressure ($P_{OILACT}$) and an expected oil pressure ($P_{OILEXP}$). $P_{OILEXP}$ is determined based on the engine operating conditions. Exemplary engine operating conditions include $T_{ENG}$ and $RPM_{ENG}$. $P_{OILEXP}$ can be determined from a look-up table using the engine operating conditions as inputs to the look-up table.

The adaptive oil pressure fault detection control also includes an adaptive learning function, which trims the initial values of $P_{OILEXP}$ during the early life of the engine with known oil quantities and qualities (e.g., factory oil fill). The adaptive learning function refines $P_{OILEXP}$ for each individual engine system. The adaptive oil pressure fault detection control can also to adjust the $P_{OILEXP}$ look-up table based on a normal use degradation value. The degradation value can be based on simple vehicle parameters including, but not limited to, vehicle mileage. Alternatively or additionally, more complicated algorithms that monitor more detailed vehicle parameters including, but not limited to, engine load, the number of combustion events, the number of engine starts, temperature cycles and the like can be implemented. For example, the oil degradation factor can be determined by an oil life monitor, which indicates when to change the oil. Parameters including, but not limited to, engine RPM and oil temperature can be used to determine the relative life of the oil.

In an exemplary embodiment, the adaptive oil pressure fault detection control determines whether the engine is operating at a steady speed. Because $P_{OILACT}$ lags $RPM_{ENG}$, execution of the adaptive oil pressure fault detection control assures that $P_{OILACT}$ has stabilized for the prevailing $RPM_{ENG}$. Whether the engine is operating at steady speed can be determined, for example, by monitoring $RPM_{ENG}$ over a threshold time period. If a difference ($\Delta RPM_{ENG}$) between a maximum $RPM_{ENG}$ value occurring during the threshold time period and a minimum $RPM_{ENG}$ value occurring during the threshold time period is less than or equal to a threshold difference ($\Delta RPM_{THR}$), the engine is deemed to be operating at steady speed. If $\Delta RPM_{ENG}$ is greater than or equal $\Delta RPM_{THR}$, the engine is deemed to not be operating at steady speed.

Figure 2:
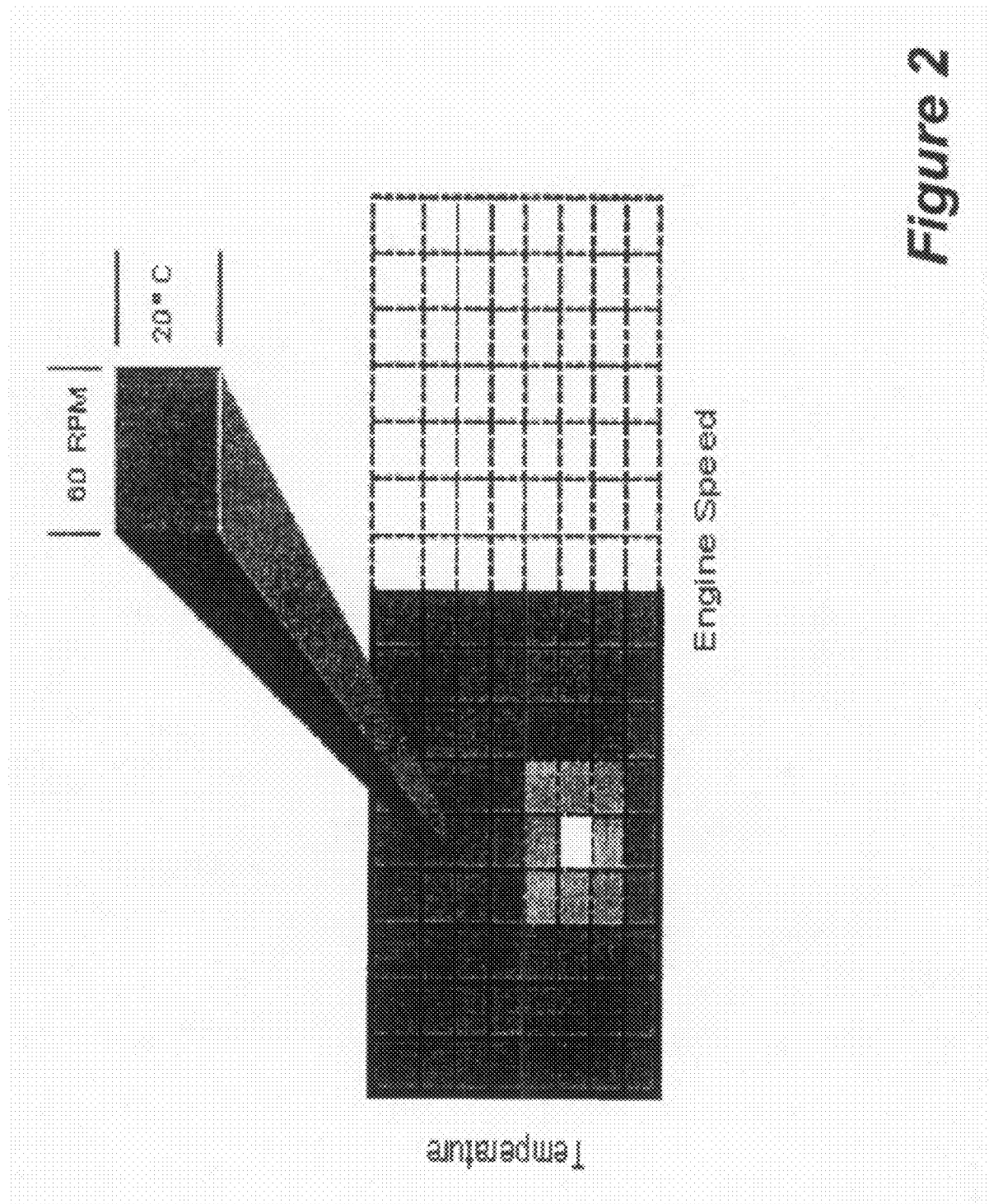
FIG. 2 illustrates a portion of an exemplary look-up table that can be implemented by the adaptive oil pressure fault detection control of the present disclosure.

If the engine is deemed to be operating at steady speed, values for the current $RPM_{ENG}$ and $T_{OIL}$ are determined. $P_{OILEXP}$ is determined based on $RPM_{ENG}$ and $T_{OIL}$, for example. In the case of a look-up table, the look-up table is comprised of cells defined by $RPM_{ENG}$ on one axis and $T_{OIL}$ on another. An exemplary portion of such a look-up table is illustrated in FIG. 2. The values in the cells represent $P_{OILEXP}$ and tolerance for the prevailing engine conditions. The look-up table is initially populated based on expected new engine oil pressure with the factory fill oil and oil filter. The tolerance accounts for variance due to factors including, but not limited to, oil life, usage (e.g., oxidation, fuel dilution and the like), oil characteristics (e.g., viscosity, additives and the like), oil filter characteristics (e.g., pressure drop variables) and variations in the oil pressure reading signal string, which includes the oil pressure sensor. The size of the cells can be symmetric or cells in selected areas can have either increased or decrease granularity.

The adaptive oil pressure fault detection control determines a difference ($\Delta P_{OIL}$) between $P_{OILEXP}$ and $P_{OILACT}$. If $\Delta P_{OIL}$ is greater than a threshold difference $\Delta P_{OILTHR}$, either positive or negative, an oil pressure error diagnostic trouble code (DTC) is set. If $\Delta P_{OIL}$ is within less than or equal to $\Delta P_{OILTHR}$, $P_{OILACT}$ is as is expected and no DTC is set. Some of the failures that can induce setting of the DTC include, but are not limited to, premature engine wear, oil pressure leak, low oil pressure, oil filter problems, faulty oil pressure sensor, non-compatible oil fill, wrong oil type and/or coolant in the oil.

In a further feature, if $\Delta P_{OIL}$ is within less than or equal to $\Delta P_{OILTHR}$, the adaptive oil pressure fault detection control determines whether the engine oil has been changed from the factory fill, whether the vehicle has traveled less than a threshold number of miles and/or whether the engine has been run less than a threshold time in total (e.g., the total hours that the engine has been run is less than a threshold number of hours). If any or each of these conditions is true, a trim block array around and including the specific $P_{OILEXP}$ cell is adjusted based on $\Delta P_{OIL}$. More specifically, the trim block array including the specific $P_{OILEXP}$ cell is adjusted in the direction of $\Delta P_{OIL}$ (e.g., positive or negative) by a predetermined percent of $\Delta P_{OIL}$. If any or each of these conditions is not true, the look-up table values are not trimmed. Instead, the basic engine characteristics can be mapped and used for future reference.

In the case of an active fuel management (AFM) type engine system, the adaptive oil pressure fault detection can be implemented to selectively prohibit deactivation of the cylinders. More specifically, if the DTC is set, as described above, deactivation of the cylinders is prohibited. By disabling deactivation of the cylinders during this fault mode, engine damage resulting from mistimed valve lifter events can be prevented. For example, it has been demonstrated that an improper oil viscosity can affect the response time of the actuation system, which is implemented to enable AFM.

Figure 3:
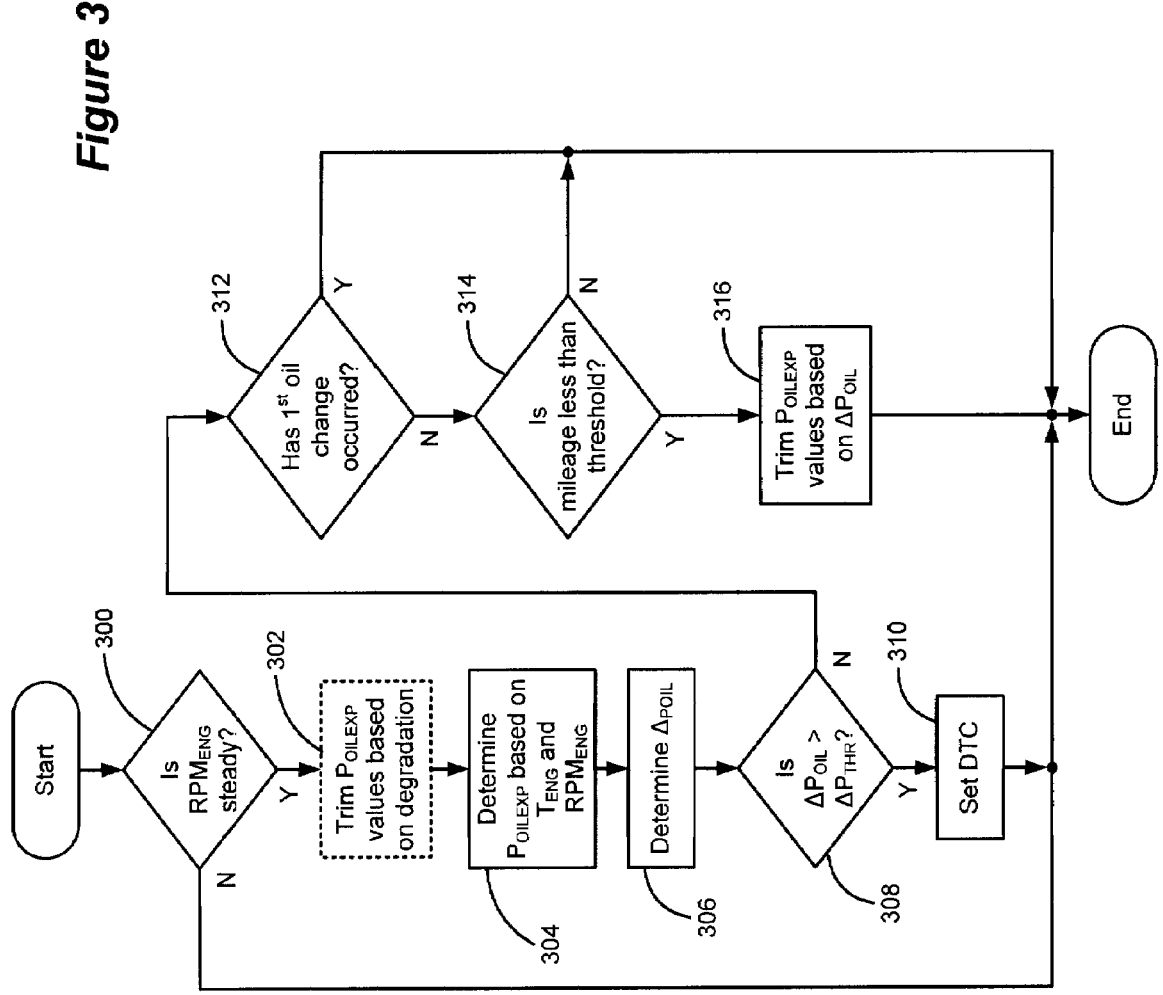
FIG. 3 is a flowchart illustrating exemplary steps that are executed by the adaptive oil pressure fault detection control.

Referring now to FIG. 3, exemplary steps that are executed by the adaptive oil pressure fault detection control will be described in detail. In step 300, control determines whether $RPM_{ENG}$ is steady. If $RPM_{ENG}$ is not steady, control ends. If $RPM_{ENG}$ is steady, control trims the $P_{EXPOIL}$ values based on the oil degradation, as discussed in detail above, in step 302. It is anticipated, however, that step 302 can be forgone if so desired. In step 304, control determines $P_{OILEXP}$ based on $T_{ENG}$ and $RPM_{ENG}$.

Control determines $\Delta P_{OIL}$ in step 306. In step 308, control determines whether $\Delta P_{OIL}$ is greater than $\Delta P_{OILTHR}$. In other implementations, control determines whether the magnitude of $\Delta P_{OIL}$ (i.e., the absolute value of $\Delta P_{OIL}$) is greater than the $\Delta P_{OILTHR}$ in step 308. If $\Delta P_{OIL}$ is greater than $\Delta P_{OILTHR}$, control sets a DTC in step 310 and control ends. If the absolute value of $\Delta P_{OIL}$ is not greater than $\Delta P_{OILTHR}$, control continues in step 312. In step 312, control determines whether the first oil change has occurred. If the first oil change has occurred, control ends. If the first oil change has not occurred, continues in step 314. In step 314, control determines whether the mileage is less than a threshold mileage. If the mileage is not less than the threshold mileage, control ends. If the mileage is less than the threshold mileage, control trims the $P_{OILEXP}$ values based on $\Delta P_{OIL}$ in step 316 and control ends.

Figure 4:
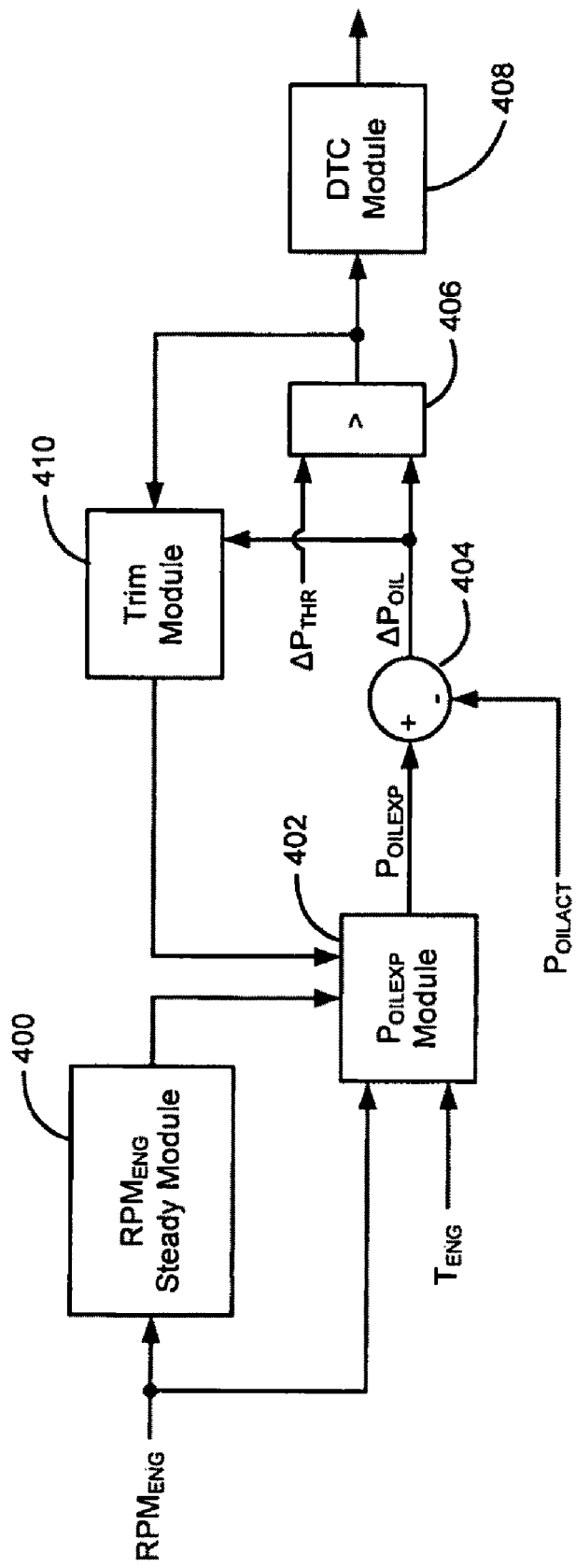
FIG. 4 is a functional block diagram of exemplary modules that execute the adaptive oil pressure fault detection control.

Referring now to FIG. 4, exemplary modules that execute the adaptive oil pressure fault detection control will be described in detail. The exemplary modules include an $RPM_{ENG}$ steady module 400, a $P_{OILEXP}$ module 402, a summer module 404, a comparator module 406, a DTC module 408 and a trim module 410. The $RPM_{ENG}$ steady module 400 determines whether $RPM_{ENG}$ is steady and generates a corresponding signal. The $P_{OILEXP}$ module 402 determines $P_{OILEXP}$ based on $RPM_{ENG}$ and $T_{ENG}$ if it receives the signal generated by the $RPM_{ENG}$ steady module 400. The $P_{OILEXP}$ values stored within the $P_{OILEXP}$ module 402 can be selectively trimmed, as described in detail above, based on a signal generated by the trim module 410.

The summer module 404 determines $\Delta P_{OIL}$ based on $P_{OILEXP}$ and $P_{OILACT}$. $\Delta P_{OIL}$ and $\Delta P_{THR}$ are input to the comparator module 406. If $\Delta P_{OIL}$ is greater than $\Delta P_{THR}$, the comparator module 406, generates a corresponding signal (e.g., 1). If $\Delta P_{OIL}$ is not greater than $\Delta P_{THR}$, the comparator module 406 generates a corresponding signal (e.g., 0). The DTC module 408 selectively sets the DTC based on the signal output from the comparator module 406. The trim module 410 selectively generates a trim signal that is output to the $P_{OILEXP}$ module 402. The trim signal can be generated based on $\Delta P_{OIL}$, mileage and/or cumulative engine operating time, as described in detail above.

The adaptive oil pressure fault detection control of the present disclosure provides more accurate oil pressure fault detection than tradition fault detection methods. This is at least partially achieved through trimming of the expected oil pressure values, as described in detail above. Furthermore, the adaptive oil pressure fault detection control described herein can be implemented in traditional engine systems without requiring additional vehicle hardware and the signal processing required to execute the control is not obtrusive to the mechanical operation of the engine system. Not only can engine failure due to lack of oil pressure be detected and avoided, other potential engine problems including, but not limited to, coolant in the oil, for example, can be detected before being detrimental to the engine system.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of monitoring pressure of oil that is implemented within an internal combustion engine, comprising:
   determining an expected oil pressure value based on engine operating conditions;
   monitoring an actual oil pressure value based on a signal generated by an oil pressure sensor;
   calculating a difference between said expected oil pressure value and said actual oil pressure value;
   comparing said difference to a threshold difference;
   generating a diagnostic trouble code when said difference exceeds said threshold difference; and
   at least one of:
      determining whether an oil change has occurred and trimming said expected oil pressure value based on said difference if said oil change has not occurred; and
      determining whether an oil change has not occurred and trimming said expected oil pressure value based on said difference if said oil change has occurred.

2. The method of claim 1 further comprising trimming said expected oil pressure value based on at least one of said difference and N parameters of the engine, where N is an integer greater than or equal to 1.

3. The method of claim 2 wherein said N parameters comprise at least one of a mileage, a cumulative number of combustion events, a cumulative number of engine starts and monitored temperature cycles.

4. The method of claim 1 wherein said expected oil pressure value is determined from a look-up table.

5. The method of claim 4 wherein expected oil pressure values that are stored within said look-up table are selectively trimmed.

6. The method of claim 1 further comprising:
   determining whether a mileage, over which the engine has operated, exceeds a threshold mileage; and
   trimming said expected oil pressure value based on said difference if said mileage is less than said threshold mileage.

7. The method of claim 1 further comprising determining whether an engine speed is steady, wherein said expected oil pressure value is determined when said speed is steady.

8. The method of claim 1 wherein said engine operating conditions include an engine speed and an engine temperature.

9. An adaptive oil pressure fault detection system that is implemented with an internal combustion engine, comprising:
   a first module that determines an expected oil pressure value based on engine operating conditions;
   a second module that monitors an actual oil pressure value based on a signal generated by an oil pressure sensor;
   a third module that calculates a difference between said expected oil pressure value and said actual oil pressure value;
   a fourth module that compares said difference to a threshold difference;
   a fifth module that generates a diagnostic trouble code when an absolute value of said difference exceeds said threshold difference; and
   a sixth module that determines whether an oil change has occurred and that trims said expected oil pressure value based on said difference if said oil change has not occurred.

10. The adaptive oil pressure fault detection system of claim 9, wherein the sixth module trims said expected oil pressure value based on a parameter of the engine.

11. The adaptive oil pressure fault detection system of claim 10 wherein said parameter includes at least one of a mileage, a cumulative number of combustion events, a cumulative number of engine starts and monitored temperature cycles.

12. The adaptive oil pressure fault detection system of claim 9 wherein said expected oil pressure value is determined from a look-up table.

13. The adaptive oil pressure fault detection system of claim 12 wherein expected oil pressure values that are stored within said look-up table are selectively trimmed.

14. The adaptive oil pressure fault detection system of claim 9, wherein the sixth module determines whether an engine speed is steady, wherein said expected oil pressure value is determined when said speed is steady.

15. The adaptive oil pressure fault detection system of claim 9 wherein said engine operating conditions include an engine speed and an engine temperature.

16. A method of monitoring pressure of oil that is implemented within an internal combustion engine, comprising:

determining an expected oil pressure value based on engine operating conditions;

monitoring an actual oil pressure value based on a signal generated by an oil pressure sensor;

calculating a difference between said expected oil pressure value and said actual oil pressure value;

comparing said difference to a threshold difference;

generating a diagnostic trouble code when said difference exceeds said threshold difference; and trimming said expected oil pressure value based on an oil change status, a cumulative number of combustion events, a cumulative number of engine starts, and an engine temperature.

* * * * *

UNITED STATES PATENT AND TRADEMARK OFFICE
CERTIFICATE OF CORRECTION

PATENT NO. : 7,665,352 B2
APPLICATION NO. : 11/703052
DATED : February 23, 2010
INVENTOR(S) : Staley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 83 days.

Signed and Sealed this

Seventh Day of December, 2010

David J. Kappos
*Director of the United States Patent and Trademark Office*